US008140360B2

(12) United States Patent
Kwan

(10) Patent No.: US 8,140,360 B2
(45) Date of Patent: *Mar. 20, 2012

(54) SYSTEM FOR PROCESSING INSURANCE COVERAGE REQUESTS

(75) Inventor: Derek Kwan, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/849,882

(22) Filed: Aug. 4, 2010

(65) Prior Publication Data

US 2010/0299162 A1     Nov. 25, 2010

Related U.S. Application Data

(63) Continuation of application No. 12/336,001, filed on Dec. 16, 2008, now Pat. No. 7,774,218, which is a continuation of application No. 11/505,162, filed on Aug. 15, 2006, now Pat. No. 7,469,215.

(30) Foreign Application Priority Data

Sep. 7, 2005   (CA) ...................................... 2518482

(51) Int. Cl.
    *G06Q 40/00*     (2012.01)
    *G06F 7/00*     (2006.01)
(52) U.S. Cl. ............................................. 705/4; 705/37
(58) Field of Classification Search ....................... 705/4
    See application file for complete search history.

(56) References Cited

U.S. PATENT DOCUMENTS 4,766,539 A     8/1988    Fox
5,855,005 A     12/1998   Schuler et al.
(Continued)

FOREIGN PATENT DOCUMENTS

JP     2001265929 A     9/2001
(Continued)

OTHER PUBLICATIONS

Pauly et al.; Guaranteed Renewability in Insurance; 1995, Journal of Risk and Uncertainty, vol. 10, No. 2, pp. 143-156.*

(Continued)

*Primary Examiner* — Luke Gilligan
*Assistant Examiner* — Ken Nguyen
(74) *Attorney, Agent, or Firm* — Schmeiser, Olsen & Watts; John Pivnichny

(57) ABSTRACT

A system for processing insurance coverage requests. An insurance data processing system (IDPS) implements a method that processes the requests. The IDPS receives at least one request from a customer relating to insurance coverage for the customer. Each request independently requests activation or deactivation of the insurance coverage. The requests are ordered in a time sequence if the at least one request includes more than one request. The IDPS verifies, for each request received, that it is permissible for the IDPS to accommodate each request. After each request is verified, the IDPS archives each request in a non-volatile storage medium of the IDPS.

16 Claims, 6 Drawing Sheets

U.S. PATENT DOCUMENTS

| | | | |
|---|---|---|---|
| 6,064,970 | A | 5/2000 | McMillan et al. |
| 6,223,983 | B1 | 5/2001 | Kjonaas et al. |
| 6,868,386 | B1 | 3/2005 | Henderson et al. |
| 6,947,881 | B1 | 9/2005 | Murakami et al. |
| 7,124,088 | B2 | 10/2006 | Bauer et al. |
| 7,275,038 | B1 | 9/2007 | Weinstock et al. |
| 7,469,215 | B2 * | 12/2008 | Kwan ............................ 705/4 |
| 7,774,218 | B2 * | 8/2010 | Kwan ............................ 705/4 |
| 2002/0055861 | A1 | 5/2002 | King et al. |
| 2002/0116228 | A1 | 8/2002 | Bauer et al. |
| 2003/0139948 | A1 * | 7/2003 | Strech ............................ 705/4 |
| 2007/0055553 | A1 | 3/2007 | Kwan |

FOREIGN PATENT DOCUMENTS

| | | | |
|---|---|---|---|
| JP | 2001282916 A | 10/2001 | |
| JP | 2001297082 A | 10/2001 | |
| JP | 2001350922 A | 12/2001 | |
| JP | 2004118542 A | 4/2004 | |
| WO | WO0058915 | 10/2000 | |

OTHER PUBLICATIONS

Notice of Allowance (Mail Date Apr. 5, 2010) for U.S. Appl. No. 12/336,001; Filing Date Dec. 16, 2008; First Named Inventor Derek Kwan; Confirmation No. 1118; Customer No. 30449.

Mannings et al.; Wireless everything—unwiring the world; Oct. 2001, BT Technology Journal, vol. 19, No. 4, pp. 65-76.

* cited by examiner

SYSTEM FOR PROCESSING INSURANCE COVERAGE REQUESTS

This application is a continuation application claiming priority to Ser. No. 12/336,001, filed Dec. 16, 2008, now U.S. Pat. No. 7,774,218, issued Aug. 10, 2010; which is a continuation application of Ser. No. 11/505,162, filed Aug. 15, 2006 which is now U.S. Pat. No. 7,469,215, issued Dec. 23, 2008.

FIELD OF THE INVENTION

The present invention relates to a method and system for processing insurance coverage requests.

BACKGROUND OF THE INVENTION

Numerous insurance products are available for insuring life and health, and for insuring many different types of property including vehicles, homes, and business. Some of these insurables may require fulltime insurance coverage on a year-round basis. However, for other types of assets, fulltime coverage may not be necessary.

For example, for automobiles, insurance coverage is often obtained for a fixed term, and renewed periodically thereafter. This is generally a reasonable arrangement for a primary transportation vehicle that is operated regularly. However, certain types of vehicles may be operated only on a seasonal basis, or only occasionally or intermittently. For vehicles that are operated seasonally, it may still be possible to obtain insurance coverage in a conventional manner, based on predetermined start and stop dates. However, this approach may limit flexibility.

What is needed is a more flexible system and method for providing insurance coverage.

SUMMARY OF THE INVENTION

The present invention provides a method for processing insurance coverage requests, said method comprising:

receiving, by an insurance data processing system (IDPS), at least one request from a customer relating to insurance coverage for the customer, each request independently requesting activation or deactivation of the insurance coverage, the requests of the at least one request being ordered in a time sequence if the at least one request comprises more than one request;

verifying by the IDPS, for each request received, that it is permissible for the IDPS to accommodate each request; and after said verifying for each request, archiving by the IDPS each request in a non-volatile storage medium of the IDPS.

The present invention provides an insurance data processing system (IDPS) for processing insurance coverage requests, said system comprising:

means for receiving a request from a customer relating to insurance coverage for the customer, said request requesting activation or deactivation of the insurance coverage;

means for verifying that it is permissible for the IDPS to accommodate the request; and means for archiving the request in a non-volatile storage medium of the IDPS after the request is verified.

The present invention provides a data processor readable medium storing data processor code that, when loaded into a data processing device, adapts the device to perform method of processing insurance coverage requests, said method comprising:

receiving, by an insurance data processing system (IDPS), at least one request from a customer relating to insurance coverage for the customer, each request independently requesting activation or deactivation of the insurance coverage, the requests of the at least one request being ordered in a time sequence if the at least one request comprises more than one request;

verifying by the IDPS, for each request received, that it is permissible for the IDPS to accommodate each request; and after said verifying for each request, archiving by the IDPS each request in a non-volatile storage medium of the IDPS.

The present invention provides a more flexible system and method for providing insurance coverage than exists in the related art.

DETAILED DESCRIPTION OF THE INVENTION

Figure 1:
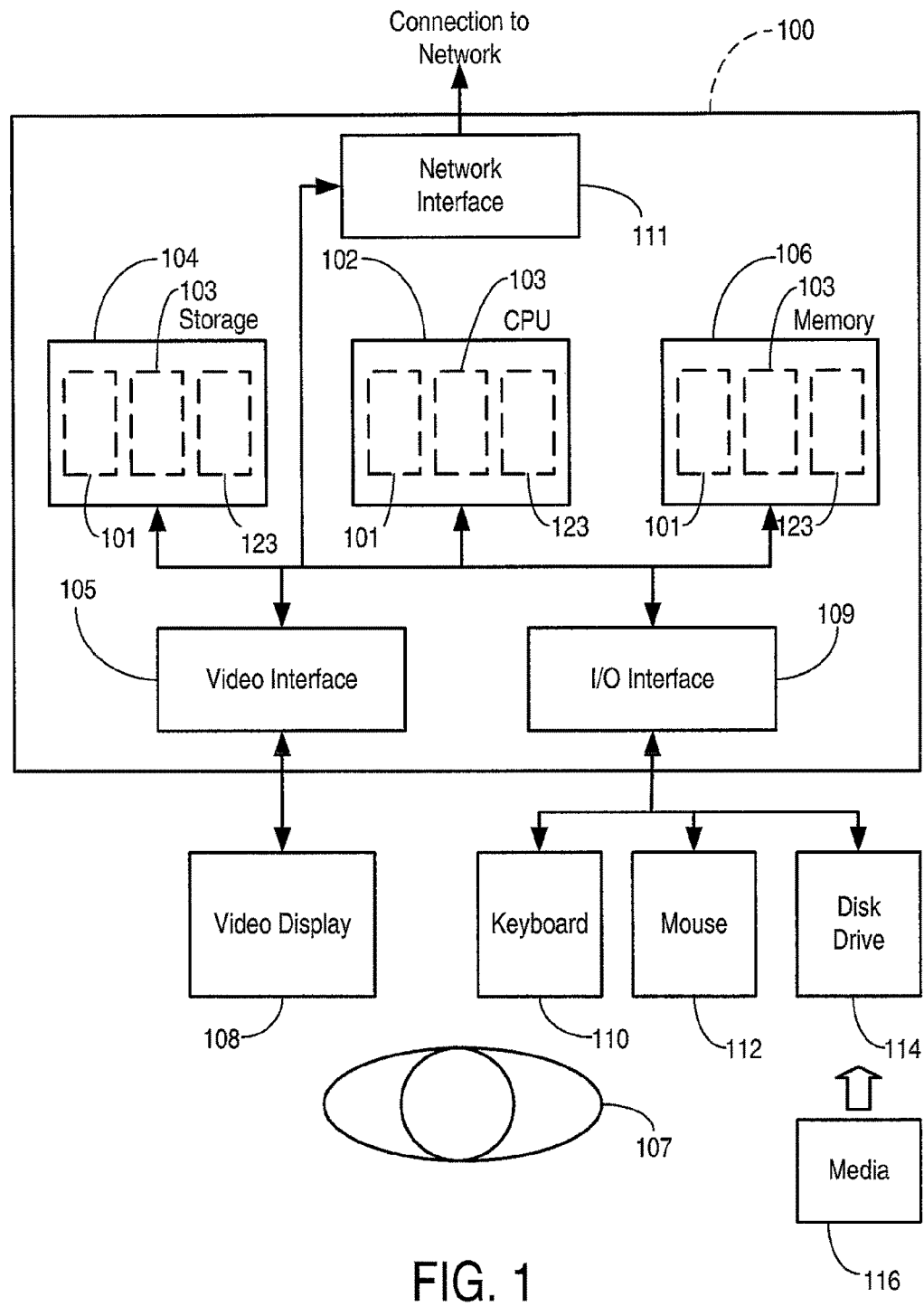
FIG. 1 shows a generic data processing system that may provide a suitable operating environment, in accordance with embodiments of the present invention.

The present invention relates to a system and method for activating insurance coverage, and for facilitating subsequent verification of insurance activation for the purposes of processing an insurance claim.

In an aspect of the invention, there is provided a system for activating insurance coverage, comprising: activation means operable by a customer for activating insurance coverage; verification means for verifying whether activation of insurance coverage is permissible; a timer for providing the date and time of activation of insurance coverage by the customer; non-volatile storage means for archiving instances of activation of insurance coverage by the customer, together with the date and time of activation.

In an embodiment, the timer is synchronized to a standard broadcast time signal.

In another embodiment, the activation means includes authorization means for authorizing the customer to request the activation of insurance coverage.

In yet another embodiment, the system further comprises a deactivation means operable by the customer for deactivating insurance coverage.

In another embodiment, the date and time of activation of insurance coverage predetermines deactivation of insurance coverage after a set period of time.

In a further embodiment, the non-volatile storage means is one of tamper-proof and tamper-evident, and auditable for verification of activation of insurance coverage in the event of an insurance claim.

In another embodiment, the activation means operated by the customer is synchronized to one of the timer and the standard broadcast time signal.

In still another embodiment, the activation means comprises a mobile electronic device operable in an offline mode, the mobile electronic device having an internal clock synchronized to one of the timer and a standard broadcast time signal, and an internal non-volatile storage means for archiving instances of insurance coverage activation by the customer together with the date and time of activation while operating in the offline mode.

In another embodiment, the internal non-volatile storage means is one of tamper-proof and tamper-evident, and auditable for verification of activation of insurance coverage in the event of an insurance claim.

In another aspect of the invention, there is provided a method of activating insurance coverage, comprising: providing an activation means operable by a customer for activating insurance coverage; verifying whether activation of insurance coverage is permissible; obtaining from a timer the date and time of activation of insurance coverage by the customer; archiving in a non-volatile storage means instances of activation of insurance coverage by the customer, together with the date and time of activation.

In an embodiment, the method further comprises synchronizing the timer to a standard broadcast time signal.

In another embodiment, the method further comprises providing authorization means for authorizing the customer to request the activation of insurance coverage.

In still another embodiment, the method further comprises providing a deactivation means operable by the customer for deactivating insurance coverage.

In another embodiment, the method further comprises predetermining deactivation of insurance coverage in dependence upon the date and time of activation of insurance coverage.

In a further embodiment, the non-volatile storage means is one of tamper-proof and tamper-evident, and the method further comprises auditing the non-volatile storage means for verification of activation of insurance coverage in the event of an insurance claim.

In another embodiment, the method further comprises synchronizing the activation means operated by the customer to one of the timer and the standard broadcast time signal.

In yet another embodiment, the method further comprising providing a mobile electronic device operable in an offline mode, the mobile electronic device having an internal clock synchronized to one of the timer and a standard broadcast time signal, and an internal non-volatile storage means for archiving instances of insurance coverage activation by the customer together with the date and time of activation while operating in the offline mode.

In still another embodiment, the internal non-volatile storage means is one of tamper-proof and tamper-evident, and the method further comprises auditing the internal non-volatile storage means for verification of activation of insurance coverage in the event of an insurance claim.

In another aspect of the invention, there is provided a data processor readable medium storing data processor code that, when loaded into a data processing device, adapts the device to activate a customer's insurance coverage, the data processor readable medium including: code for verifying whether activation of insurance coverage requested by the customer is permissible; code for obtaining from a timer the date and time of activation of insurance coverage by the customer; code for archiving in a non-volatile storage means instances activation of insurance coverage by the customer, together with the date and time of activation.

In an embodiment, the data processor readable medium further includes code for synchronizing the timer to a standard broadcast time signal.

In another embodiment, the data processor readable medium further includes code for authorizing the customer to request the activation of insurance coverage.

In yet another embodiment, the data processor readable medium further includes code for providing a deactivation means operable by the customer for deactivating insurance coverage.

In still another embodiment, the data processor readable medium further includes code for predetermining deactivation of insurance coverage in dependence upon the date and time of activation of insurance coverage.

In another embodiment, the data processor readable medium further includes code for auditing the non-volatile storage means for verification of activation of insurance coverage in the event of an insurance claim.

In a further embodiment, the data processor readable medium further includes code for synchronizing the activation means operated by the customer to one of the timer and the standard broadcast time signal.

As noted above, the present invention relates to a method and system for activating insurance coverage, and for facilitating subsequent verification of activation of insurance coverage for processing an insurance claim.

As will be explained infra, the invention may be embodied in various physical configurations which may include data processing systems, networks, devices, software and firmware. The particular configurations shown by way of example in this specification are not meant to be limiting.

FIG. 1 shows a generic data processing system 100 that may include a central processing unit ("CPU") 102 connected to a storage unit 104 and to a random access memory 106, in accordance with embodiments of the present invention. The CPU 102 may process an operating system 101, application program 103, and data 123. The operating system 101, application program 103, and data 123 may be stored in storage unit 104 and loaded into memory 106, as may be required. An operator 107 may interact with the data processing system 100 using a video display 108 connected by a video interface 105, and various input/output devices such as a keyboard 110, mouse 112, and disk drive 114 connected by an I/O interface 109. In known manner, the mouse 112 may be configured to control movement of a cursor in the video display 108, and to operate various graphical user interface ("GUI") controls appearing in the video display 108 with a mouse button. The disk drive 114 may be configured to accept data processing system readable media 116. The data processing system 100 may form part of a network via a network interface 111, allowing the data processing system 100 to communicate with other suitably configured data processing systems (not shown).

Figure 2:
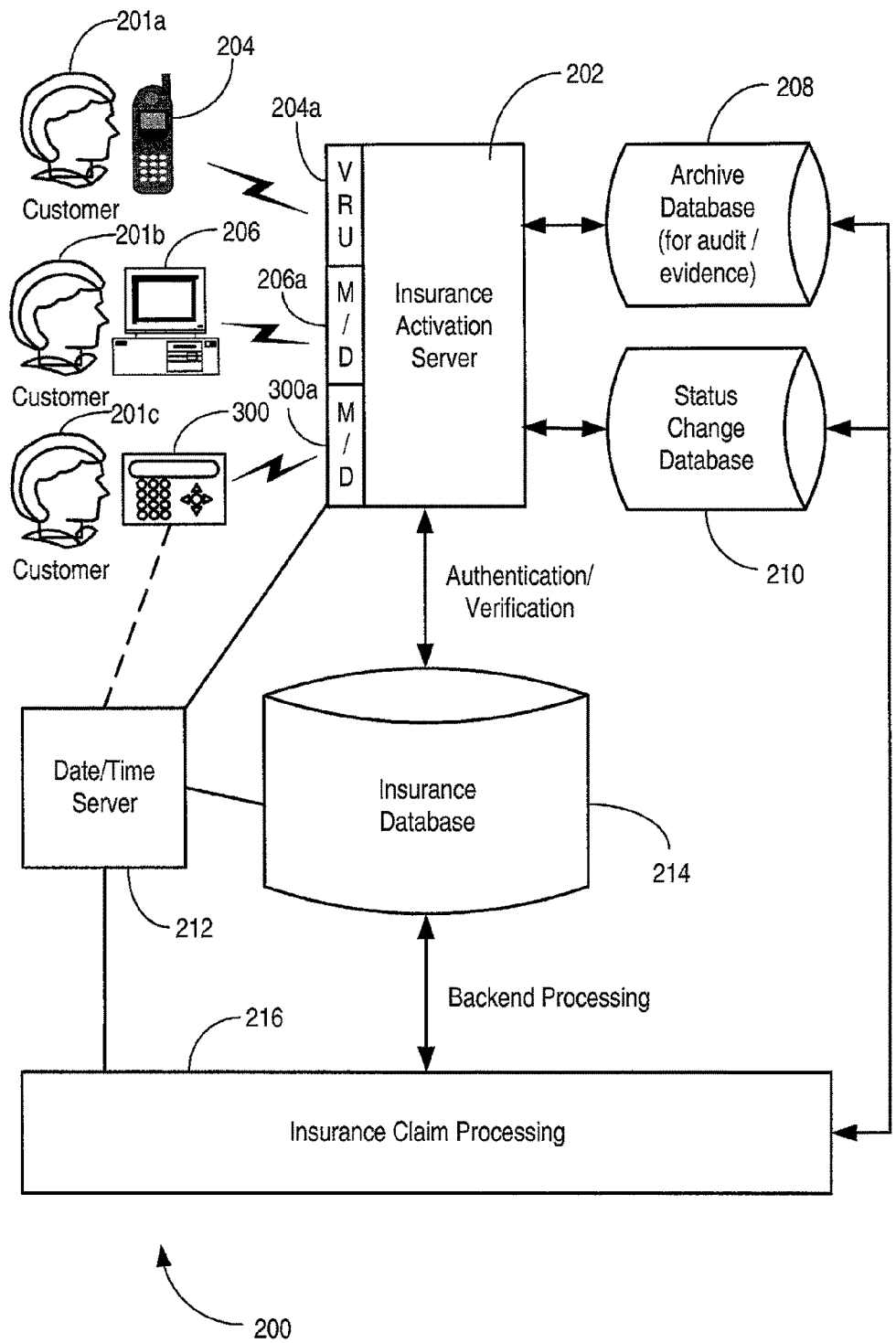
FIG. 2 shows an illustrative schematic diagram of an insurance data processing system (IDPS) for activating insurance coverage on demand, in accordance with embodiments of the present invention.

FIG. 2 shows an illustrative schematic diagram of an insurance data processing system (IDPS) 200 for activating and deactivating insurance "on demand", in accordance with embodiments of the present invention. System 200 may contain one or more data processing systems, such as the data processing system 100 illustrated in FIG. 1, in standalone or networked configurations.

The system 200 shown in FIG. 2 comprises: an insurance activation server 202; an archive database 208 connected to the insurance activation server 202; a status change database 210 connected to the insurance activation server 202; an insurance database 214 connected to the insurance activation server 202; a claim processing server 216 connected to the insurance activation server 202; a date/time server 212 connected to the insurance activation server 202, the insurance database 214, the claim processing 216; and mobile electronic device 300.

As shown in FIG. 2, an insurance activation server 202 may interact with one or more access devices 204, 206, 300 operated by one of customers 201a, 201b and 201c (collectively customer 201). Insurance activation server 202 may be, for example, a generic data processing system (e.g. data processing system 100) appropriately configured as a server. As shown by way of example, the access devices may include a telephone 204, a computer 206, and a mobile electronic device 300. (An illustrative example of a mobile electronic device 300 is described with reference to FIGS. 3A and 3B below.)

Insurance activation server 202 may be operatively connected to a secure archive database 208 for logging or archiving each instance of an instruction for activation of insurance coverage received from customer 201. Insurance activation server 202 may also be operatively connected to a status change database 210 for updating and maintaining a current status for insurance coverage for a particular customer 201. Archive database 208 and status change database 210 may reside either on different physical storage devices, or on the same physical storage device provided that appropriate access controls and restrictions are put in place for each database.

Date/time server 212 may be used to synchronize the date and time for tracking activation of insurance coverage within system 200. Date/time server 212 may be synchronized to a standard broadcast date and time signal that may also be used by telephone 204, computer 206, and mobile electronic device 300.

Insurance database 214 may store particular details and selectable insurance coverage options for each insurance policy previously set up for each customer 201 and entered into system 200. Insurance database 214 may be configured to be accessible by insurance activation server 202 for verification of the insurance policy and selectable options for a particular customer 201. Insurance database 214 may also be configured to be accessible by claim processing 216 when subsequently processing an insurance claim, as described further below.

As illustrated in FIG. 2, customer 201 may access insurance activation server 202 using any one of a number of different activation means. For example, customer 201 may use a touchtone telephone 204 to access insurance activation server 202 via a suitable voice response unit or VRU 204a interface. Telephone 204 may be a conventional landline telephone, a cell phone, a satellite phone, etc. that may be used to access VRU 204a.

Telephone 204 may also be a miniature computer platform based cell phone with random access memory and advanced data processing capabilities, allowing telephone 204 to store and execute mini-applications or "applets". These applets may perform specific functions that would otherwise be performed using a suitably configured computer 206 (e.g. data processing system 100 of FIG. 1). A compatible computer modem or network interface 206a may provide customer 201 with access to insurance activation server 202 and its various functions.

Customer 201 may also use a mobile electronic device 300, with a suitable communications interface 300a that may be used to receive communications from device 300, and to send communications back to device 300.

Whether customer 201 interacts with insurance activation server 202 using a telephone 204, computer 206, mobile electronic device 300, or some other access device, insurance activation server 202 may be accessed to facilitate activation of insurance coverage on demand, as will be described further below.

Insurance activation server 202 may be configured to provide high system availability in order for customers 201 to access insurance activation server 202 at virtually any time, and to activate insurance coverage on demand. However, in the event that immediate access to insurance activation server 202 is unavailable for whatever reason, customer 201 may be given an option to activate insurance coverage "offline". This may be achieved, for example, by using a suitably configured device that is operable in an offline mode.

Figure 3A:
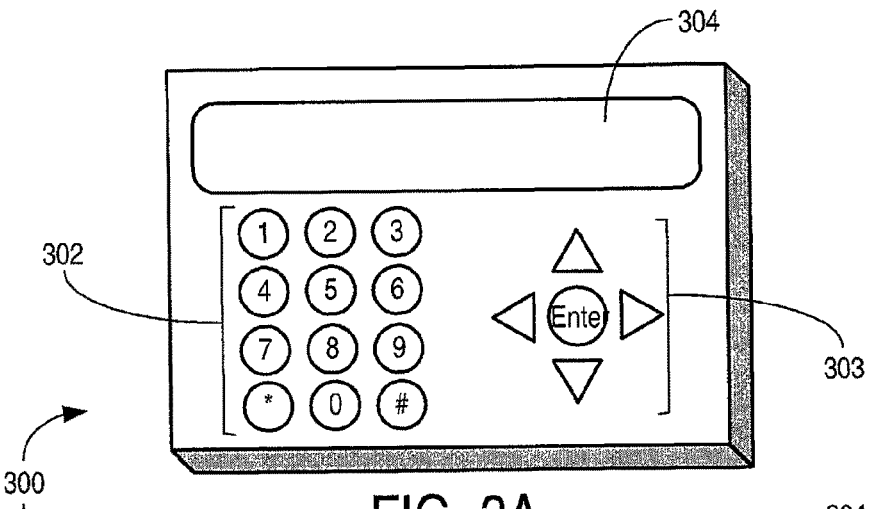
FIG. 3A and FIG. 3B show an illustrative example of a mobile electronic device for use in the system of FIG. 2, in accordance with embodiments of the present invention.
Figure 3B:
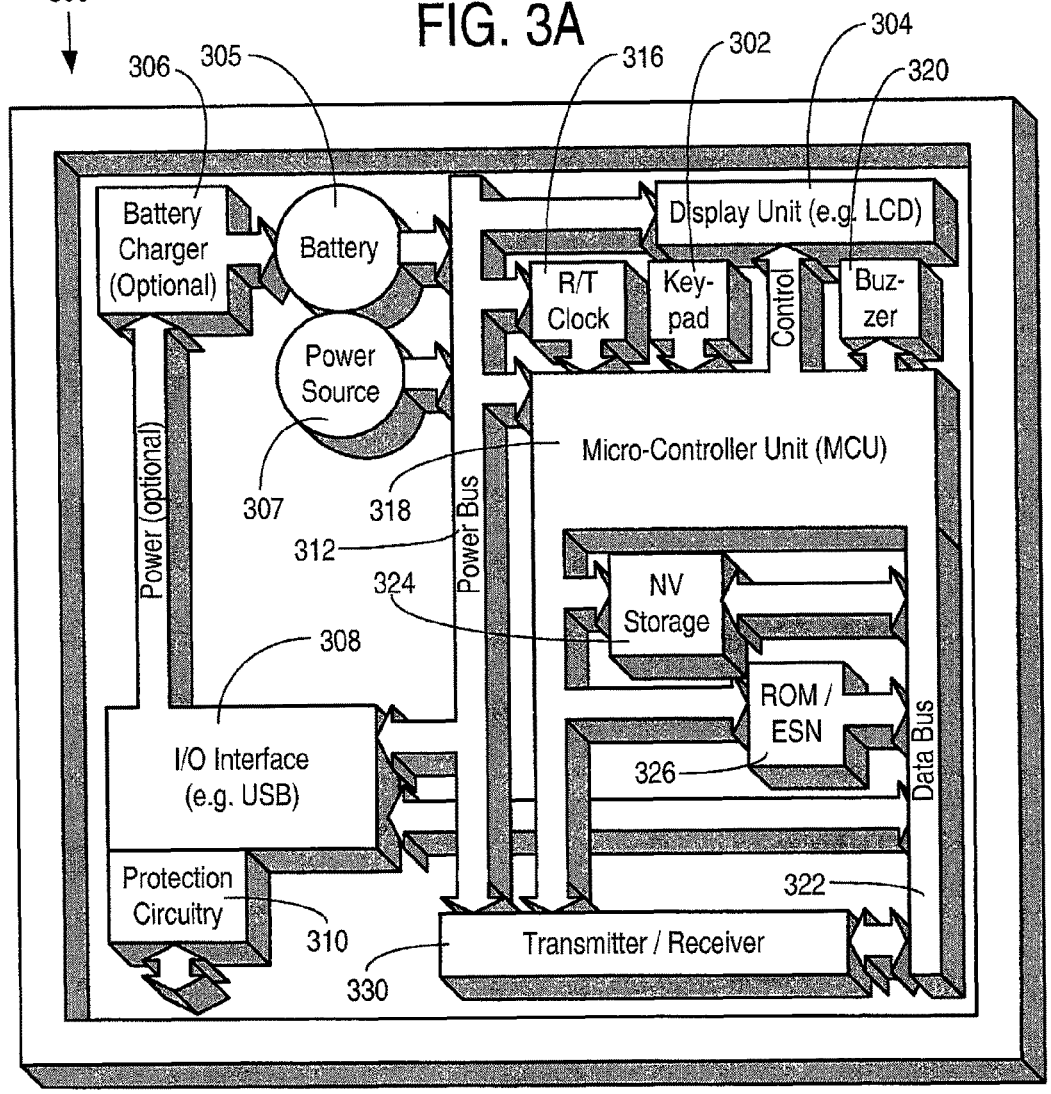

FIG. 3A and FIG. 3B show a device 300 that may be used in an offline mode in system 200 of FIG. 2, in accordance with embodiments of the present invention. Device 300 may be issued, for example, by an insurer providing customer 201 with insurance coverage that may be activated on demand using device 300. Alternatively, an insurance broker or agent may provide the device 300 to consumers and act as an intermediary by providing insurance coverage on demand from various insurers offering competing insurance products.

As shown in FIG. 3A, illustrative device 300, comprised by the system 200, includes a keypad 302 for inputting data, a display 304 for allowing customer 201 to view data, and data navigation keys 303 for scrolling through and selecting various options from a menu presented in display 304.

As shown schematically in FIG. 3B, illustrative device 300 may include various internal components. Device 300 and its internal components should operate reliably, and be able to maintain date/time accuracy over a range of operating conditions.

Preferably, device 300 includes a mobile power source, such as a battery 305. Device 300 may also include an auxiliary power source 307 (e.g. solar power cell), such that device 300 may be conveniently carried by customer 201 and kept operational over an extended period of time. Device 300 may also include a battery charger 306 for periodically recharging battery 305, and an I/O interface 308 that may provide access to a suitable communications/power connection port of a computer (e.g. to a Universal Serial Bus or USB port) via suitable protection circuitry 310.

As shown, a power bus 312 connected to battery 305 and auxiliary power source 307 may provide electrical power to a display unit 304, a real-time clock 316, a Micro-Controller Unit or MCU 318, an optional transmitter/receiver 330, and any other internal component requiring power.

Still referring to FIG. 3A and FIG. 3B, display unit 304 may be a Liquid Crystal Display (LCD) or the like, and be controlled by MCU 318 to provide customer 201 with feedback on data the customer 201 has entered into device 300 via key-pad 302. Display unit 304 may also display various menu choices for navigation and selection of options by customer 201.

Real-time clock 316 may be configured to keep track of date and time for device 300. Real-time clock 316 may be initially set by the issuer of device 300, or otherwise be configured to automatically synchronize or resynchronize to a standard broadcast time signal so that device 300 is substantially in synch with the date/time kept by date/time server 212 of FIG. 2. Synchronization or resynchronization of the date and time may occur, for example, by receiving a standard broadcast time signal via transmitter/receiver 330, or alternatively by receiving date/time data through I/O interface 308 when device 300 is connected to an external device capable of providing date/time data.

Real-time clock 316 should preferably be tamper-proof, as it may be used to audit the date and time of activation of insurance coverage by customer 201. Therefore, the synchronization or resynchronization function as described above should not allow customer 201 to set the date and time manually to something other than the actual date and time. As well, in order to maintain integrity and confidentiality of customer data, any data transmitted between device 300 and insurance activation server 202 or another external device should preferably be digitally encrypted, and may be signed to identify an authorized access device, or otherwise secured.

Still referring to FIG. 3A and FIG. 3B, MCU 318 may be configured to run suitable data processor readable code to control various functions of device 300. For example, suitable data processor readable code may activate buzzer 320 to alert customer 201 to various warnings or error conditions, such as low battery charge, etc.

MCU 318 may also be operatively connected via a data bus 322 to a non-volatile storage device 324, and to a read-only memory or ROM 326. ROM 326 may be configured to contain an Electronic Serial Number or ESN which uniquely identifies device 300. At the time of issue of device 300, this ESN may be associated with a particular customer 201 to uniquely identify the customer 201. ROM 326 may also contain operational code for MCU 318.

Non-volatile storage device 324 and ROM 326 should preferably be tamper-proof or tamper-evident, such that integrity of data stored in non-volatile storage device 324 and ROM 326 can be assured for auditing purposes in the event of a subsequent insurance claim made by customer 201. By way of example, non-volatile storage device 324 may be configured as a Write-Once-Read-Many (WORM) type of storage with capacity to record all instances of activation of insurance coverage by customer 201. Non-volatile storage device 324 may also be configured, for example, as a Programmable Read-Only Memory (PROM), which may be written to just once.

While the discussion above refers generally to activation of insurance coverage by customer 201, it will be appreciated that system 200 and the access devices 204, 206, 300, may be configured such that customer 201 may also deactivate insurance coverage on demand. However, to minimize the risk of unintended changes, confirmation of an instruction for activation or deactivation of insurance coverage preferably should be sought prior to effecting the requested change.

By way of example, if an insurance deactivation option is enabled, device 300 may be configured with a single push button that can be used by customer 201 to toggle between an activated or deactivated insurance coverage state. Alternatively, a dual button design may be used, whereby one button is used to activate insurance coverage, and the other is used to deactivate insurance coverage.

In an embodiment, device 300 may be configured such that, when device 300 is power up for the first time, device 300 operates continuously until customer 201 has a need to make an insurance claim, based on an instance of insurance activation recorded in device 300. With a suitable power source, continuous operation of device 300 may extend, for example, for a year or more. In a subsequent reset of device 300 that may be necessitated by an exhausted power source or a reset condition (e.g. indicating a need to make an insurance claim), device 300 may be configured to awake in a locked read only mode, such that auditing and verification of insurance coverage can take place without any further change in data or status being possible in device 300.

The operation of illustrative device 300 and its use within system 200 of FIG. 2 will now be described in more detail.

Figure 4:
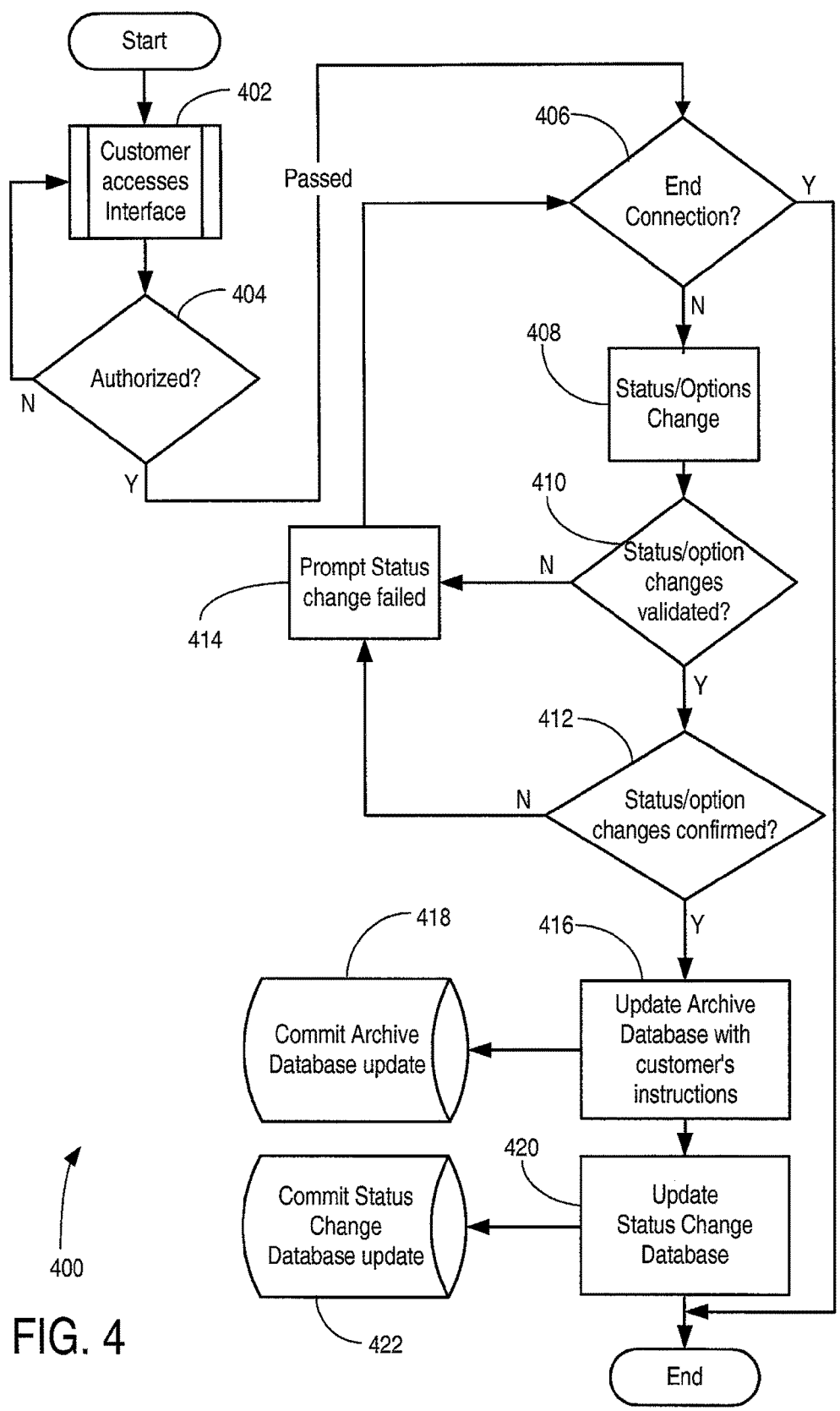
FIG. 4 shows a flowchart of an illustrative insurance activation method, in accordance with embodiments of the present invention

FIG. 4 shows a flowchart of an illustrative method 400 for activating (or deactivating) insurance coverage, in accordance with embodiments of the present invention. At block 402 of method 400, a customer (e.g. customer 201) requests access (e.g. to an insurance activation server 202) via a user interface device (e.g. via a telephone 204, a computer 206, or a mobile electronic device 300), to activate or deactivate insurance coverage for the customer 201.

Upon receiving the access request at block 402, method 400 proceeds to decision block 404, where customer 201 is required to identify himself/herself to ensure that the activation or deactivation of insurance coverage for customer 201 is effected only by an authorized person or persons. This authorization step may require customer 201 to identify himself/ herself by providing a userid or some other unique identifier, and to enter a password or Personal Identification Number (PIN) associated with that userid or unique identifier. In the illustrative example of system 200, if customer 201 uses telephone 204 to access a VRU 204a, VRU 204a may prompt customer 201 to enter a numeric userid or unique identifier using a key-pad on telephone 204. This may be followed by prompting customer 201 to enter a password or PIN associated with that userid or identifier. If a computer 206 is used, a password prompt may appear within a GUI window so that customer 201 can input both a userid and password via a keyboard. If device 300 is used, key-pad 302 may be used to enter a userid and to subsequently enter a PIN associated with that userid. Alternatively, the ESN for the device 300 may be used to uniquely identify the customer, and therefore it may be necessary for the customer to enter only the PIN.

If customer 201 is not properly authorized at block 404, method 400 may return to decision block 402. Once customer 201 has been authorized at decision block 402, method 400 may proceed to block 406, where method 400 may either proceed to block 408, or allow the connection to end (i.e., without making a change).

At block 408, customer 201 may be provided with menu options to allow customer 201 to select various insurance coverage options or to change status. In the illustrative example of system 200, if a telephone 204 is used, VRU 204a may interact with insurance activation server 202 to offer customer 201a choice of options by recorded voice prompts. Customer 201 may then navigate and select an option by responding to VRU 204a voice prompts by inputting data via touchtone buttons on telephone 204. If a computer 206 is used instead, a GUI interface may provide a menu from which customer 201 may select activation or deactivation of insurance coverage using a mouse or keyboard. If a mobile electronic device 300 is used, e.g. as illustrated in FIG. 3A and FIG. 3B, device 300 may include a key-pad 302 and navigation keys 303 to allow customer 201 to navigate and select menu options for activating or deactivating insurance coverage.

From block 408, method 400 proceeds to decision block 410 where the coverage option or status change selected by customer 201 may be verified as being permissible (e.g. as verified against insurance database 214 in system 200 of FIG. 2). The selection of the coverage option or status change may comprise a request to the system 200 to activate or deactivate insurance coverage for the customer 201. If the selected option or change in status is not verified as being permissible at block 410, method 400 proceeds to block 414 to indicate that the requested status or option change is not valid. If the selected option or change in status is validated at block 410, method 400 proceeds to decision block 412.

At decision block 412, method 400 may seek confirmation that customer 201 wishes to change the status or options for insurance coverage. This confirmation step is intended to minimize the possibility that a customer 201 may unintentionally activate or deactivate insurance coverage. If the selected change is not confirmed by customer 201 at block 412, method 400 returns to block 414. If, on the other hand, the change is confirmed by customer 201 at block 412, method 400 proceeds to block 416, where the change in status or options is recorded and logged in an archive database at 418 (e.g. in archive database 208 of FIG. 2). Preferably, any instance of activation or deactivation of insurance coverage or selected options at block 412 should be permanently archived at 418. The archive may then be later used to confirm the customer's instructions for activating or deactivating insurance coverage when processing an insurance claim, as described further below.

From block 416, method 400 may then proceed to block 420 where the confirmed status change can be stored at 422 in a status change database (e.g. status change database 210 of FIG. 2). Method 400 may then end.

Figure 5:
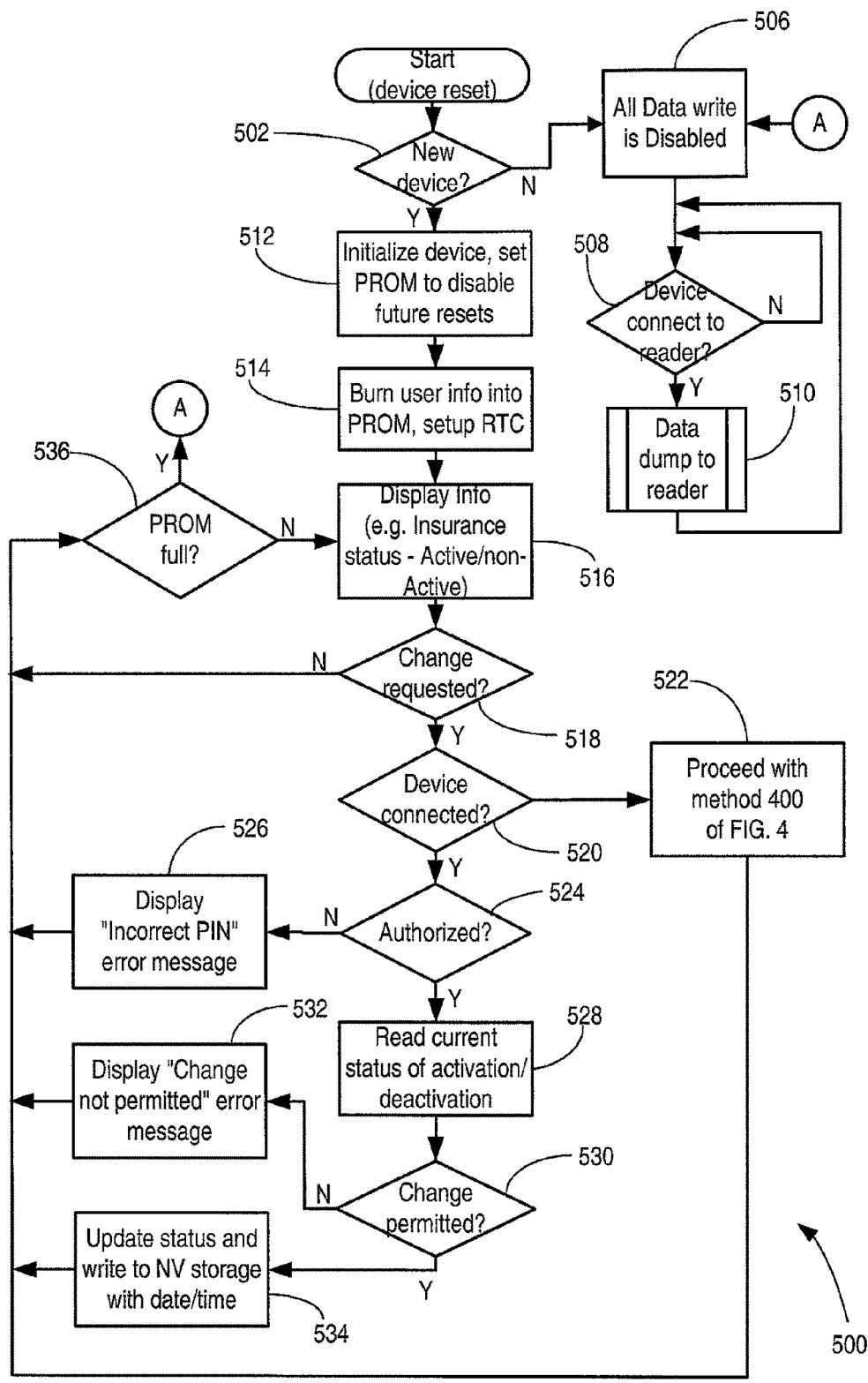
FIG. 5 shows a flowchart of an illustrative method of utilizing the device of FIG. 3A and FIG. 3B to activate insurance coverage, in accordance with embodiments of the present invention.

FIG. 5 shows a flowchart of an illustrative method 500 of utilizing the device of FIG. 3A and FIG. 3B to activate insurance coverage within system 200, in accordance with embodiments of the present invention. Method 500 begins at block 502 where, if device 300 is a not new device, method 500 proceeds to block 506 where all data write functions for device 300 may be disabled. This may correspond to waking up in a locked read only mode in any "reset" of device 300, as previously mentioned.

Method 500 then proceeds to decision block 508 where method 500 determines whether device 300 is connected to an external device or reader, such as computer, via its I/O interface 308. If yes, method 500 may proceed to block 510 where data stored in non-volatile storage means 324 (e.g. a PROM 324) is dumped to the external device or reader for processing. Otherwise, if device 300 is a new device, method 500 proceeds to block 512, where device 300 is initialized, and PROM 324 may be set to disable any further resets of device 300, e.g. when turned off and turned back on. Method 500 may then proceed to block 514, where data associated with customer 201 may be burned into PROM 324, and real-time clock 316 is synchronized to a standard broadcast time signal (e.g. as provided by a date/time server 212 of FIG. 2).

From block 514, method 500 proceeds to block 516, where method 500 displays (e.g. via display 304) the current insurance status. If device 300 is a new device that was just initialized, the initial default insurance status may be non-active.

From block 516, method 500 proceeds to decision block 518, where method 500 determines if customer 201 has requested activation of insurance. As previously noted, in an embodiment, customer 201 may request activation of insurance by pressing an activation button on device 300. Alternatively, a menu selection for activating insurance coverage may be selected by customer 201 via display unit 314 and navigation keys 303.

If a change in activation status has been requested by customer 201, method 500 may proceed to decision block 520, where method 500 determines whether device 300 presently has an available connection to insurance activation server 202. If a connection is available, method 500 may proceed to block 522 and communicate with system 200 in a substantially analogous manner as described earlier with reference to method 400 of FIG. 4, for example.

If a connection is not available, method 500 may proceed to block 524, where device 300 performs its own authorization step by prompting customer 201 to enter a PIN, and then comparing the entered value with a previously stored value (e.g. as stored in ROM 326 or in non-volatile storage means or PROM 324). If the entered PIN is incorrect, an error message may be displayed at block 526 and method 500 may return to block 536, described below. Otherwise, if the entered PIN is correct, method 500 may proceed to block 528 where method 500 may read the current status of insurance activation (e.g. as last stored in non-volatile storage means 324).

From block 528, method 500 may proceed to decision block 530, and determine if the requested change in status is permitted by the current state of insurance activation. If yes, method 500 may proceed to block 534 to update the status and write the request for change into non-volatile storage means 324, together with the date and time, as read from real-time clock 316. Method 500 may then proceed to block 536, described below. If no, method 500 may proceed to display an error message at block 532, and proceed to decision block 536. If, at decision block 536, the PROM is not full, then method 500 may return to block 516. Otherwise, method 500 may proceed to block 506 and disable further data writes.

The customer 201 may issue requests (as described supra) in a time sequence such that each request independently requests activation or deactivation of insurance coverage for the customer 201. For example, the customer 201 may issue the requests in a time sequence to toggle between an insurance activated state and an insurance deactivated state. However, in an alternative embodiment, each request comprising instance of activation of insurance coverage may start coverage for a predetermined amount of time, with no need for manual deactivation. For example, requesting insurance activation, and then confirming the request for activation may activate insurance coverage for a fixed 24 hour period before the insurance automatically expires. In this alternative embodiment, customer 201 need only be concerned with activating insurance coverage, for example, at the start of each day for which insurance coverage is desired.

In yet another embodiment, a block of time credits for insurance coverage time may be purchased, such that customer 201 can activate and deactivate insurance coverage on demand for as long as insurance coverage time credits remains in a "bank" tracked by device 300. Use of such credits may allow an insurer to provide different pricing points for a given bundle of insurance credits, for example. Thus, for an individual request requesting activation of the insurance coverage for a time duration, wherein insurance coverage time credit for insurance coverage time has been previously purchased by the customer and includes a remaining amount of insurance time credit when the individual request is received from the customer 201 by the system 200, the individual request may be verified to be permitted in step 410 of FIG. 4 or in step 530 of FIG. 5 if the time duration does not exceed the remaining amount of insurance time credit.

If device 300 has been operated in offline mode, once a connection to insurance activation server 202 has been re-established, an update of archive database 208 and status change database 210, with the data previously stored into non-volatile storage means 324 in step 534, may occur (e.g., may automatically occur), such that device 300 and the rest of system 200 are once again synchronized. Thus, data stored in non-volatile storage means 324 may be copied and recorded in archive database 208, such that any instances of activation or deactivation of insurance coverage recorded while device 300 is in offline mode can be audited as necessary in an insurance claim made by customer 201.

Figure 6:
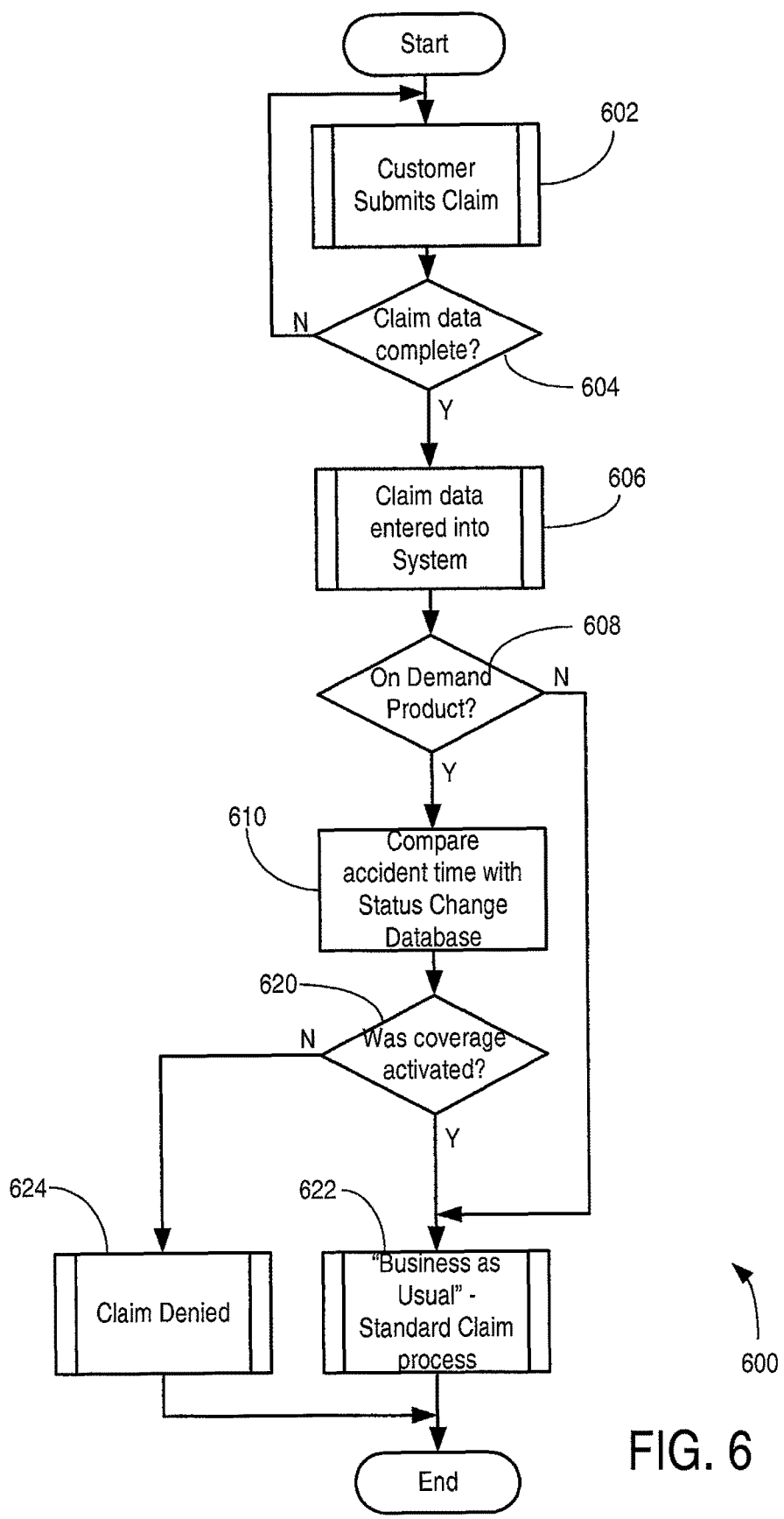
FIG. 6 shows a flowchart of an illustrative method for verifying activation of insurance coverage, in accordance with embodiments of the present invention.

FIG. 6 shows a flowchart of an illustrative method 600 for verifying activation of insurance coverage upon receiving an insurance claim made by a customer 201, in accordance with embodiments of the present invention. As shown, at block 602, a customer may submit an insurance claim. At decision block 604, method 600 may check whether the claim data is complete. If no, method 600 may require customer 201 to resubmit a claim. If yes, method 600 may proceed to block 606, where the claim data is entered into the system (e.g. system 200 of FIG. 2).

Method 600 may then proceed to decision block 608, where method 600 determines whether the insurance claim is for an insurance "on demand" product. If no, method 600 may proceed to a standard "business as usual" claim process. If yes, method 600 may proceed to block 610.

At block 610, in order to determine whether the customer's insurance claim is valid, method 600 may determine whether insurance was active at the time of the accident by correlating the accident time with the activation status as recorded in an archive database (e.g. archive database 208 of FIG. 2) or a status change database (e.g. status change database 210 of FIG. 2). There may be a number of ways to verify this, depending on the selected configuration. For example, if activation of insurance coverage by customer 201 automatically starts a predetermined time period for coverage (e.g. 24 hours), then it will be necessary only to confirm that the accident took place within that 24 hour period from activation. This may be verified, for example, by determining the time of the accident as reported by the customer 201, which may be corroborated with the time of the accident as reported by a law enforcement authority, or by another party involved in an accident. Alternatively, in order to verify that insurance was active at the time of coverage, customer 201 may be required to report the accident immediately via any access methods or devices that may be available. If customer 201 happens to be using device 300 in offline mode when an accident occurs, customer 201 may, for example, either enter a request to submit a claim for insurance, or simply turn off the device 300. Device 300 may be configured to record the date/time to non-volatile storage means 324 upon being turned off. When device 300 is reset, it may be configured to default to a read only mode where no further changes may be made. Should customer 201 be unable to report the accident immediately for whatever reason, the default option may be verification of the time of the accident through a law enforcement authority, or corroboration by a third party.

Whichever way is used, if insurance activation at the time of the accident is verified, method 600 may proceed to block 622 and process the claim with confirmation of insurance coverage. Otherwise, if it is determined that insurance coverage was not activated at the time of the accident, method 600 may proceed to block 624 where the insurance claim is denied.

While illustrative embodiments of the invention have been described above, it will be appreciated by those skilled in the art that variations and modifications may be made. For example, device 300 may be provided in various alternative configurations, with various ways for activating or deactivating insurance. However, in each case, a request for activation or deactivation will be recorded in a non-volatile storage that is tamper-proof or tamper-evident, either in an offline mode (e.g. within device 300) or within system 200 as described by way of example above.

What is claimed is:

1. A computer program product, comprising a computer readable storage media having computer readable program code stored therein, said computer readable program code configured to be executed by a processor comprised by a insurance data processing system (IDPS) to implement a method for processing insurance coverage requests, said IDPS further comprising: (a) a wireless device consisting of a mobile electronic device provided to a customer, (b) an insurance activation server, and (c) an archive database connected to the insurance activation server, said method comprising:

receiving, by the IDPS, a plurality of requests from the customer relating to insurance coverage for the customer, each request requesting activation or deactivation of the insurance coverage;

confirming by the IDPS, for each request received, that it is permissible for the IDPS to accommodate each request based on each request's requested activation or deactivation; and after said confirming for each request, archiving by the IDPS each request in a non-volatile storage medium of the IDPS;

wherein the mobile electronic device comprises the non-volatile storage medium;

wherein said receiving, said confirming, and said archiving are performed with respect to each request by the mobile electronic device while the mobile electronic device is in an offline mode, said offline mode characterized by the mobile electronic device being disconnected from the insurance activation server and any other external communication device;

wherein after said archiving is performed, the method further comprises: while a connection is established between the mobile electronic device and the insurance activation server, said server updating the archive database with each request archived in the non-volatile storage medium;

wherein the method further comprises determining that an insurance claim by the customer relating to an accident is valid by verifying that the insurance coverage was active at a time when the accident occurred based on the most recent requested activation or deactivation, said verifying occurring when the mobile electronic device is connected to the insurance activation server and comprising determining by the server that a request to submit the insurance claim is stored in the mobile electronic device operating in the offline mode.

2. The computer program product of claim 1, wherein the method further comprises: said mobile electronic device tracking insurance coverage credits in a bank while the mobile electronic is operating in the offline mode, said insurance coverage credits being credits for insurance coverage time purchased by the customer.

3. The computer program product of claim 2, wherein the insurance coverage credits are time credits in a bank tracked by the mobile device.

4. The computer program product of claim 3, wherein the method further comprises:

in response to a new request received from the customer for activation of the insurance coverage for a time duration, ascertaining that the remaining amount of time of said time credit exceeds the time duration; and responsive to said ascertaining, granting the new request.

5. The computer program product of claim 1, wherein the requests of the plurality of requests are ordered in a time sequence.

6. The computer program product of claim 1, wherein the mobile electronic device is configured to be used in the offline mode by the customer to activate the insurance coverage from any insurer of a plurality of insurers offering competing insurance products pertaining to the insurance coverage.

7. The computer program product of claim 1, wherein each request requesting activation or deactivation is implemented through use of a single push button in the mobile electronic device to toggle between said activation and said deactivation.

8. The computer program product of claim 1, wherein said verifying further comprises that a date/time stored in the mobile electronic device in response to the mobile electronic device having been turned off and entered into a read-only mode corresponds to the time when the accident occurred.

9. An insurance data processing system (IDPS) comprising a processor and a computer readable memory unit coupled to the processor, said memory unit containing program code configured to be executed by the processor to implement a method for processing insurance coverage requests, said IDPS further comprising: (a) a wireless device consisting of a mobile electronic device provided to a customer, (b) an insurance activation server, and (c) an archive database connected to the insurance activation server, said method comprising:

receiving, by the IDPS, a plurality of requests from the customer relating to insurance coverage for the customer, each request requesting activation or deactivation of the insurance coverage;

confirming by the IDPS, for each request received, that it is permissible for the IDPS to accommodate each request based on each request's requested activation or deactivation; and after said confirming for each request, archiving by the IDPS each request in a non-volatile storage medium of the IDPS;

wherein the mobile electronic device comprises the non-volatile storage medium;

wherein said receiving, said confirming, and said archiving are performed with respect to each request by the mobile electronic device while the mobile electronic device is in an offline mode, said offline mode characterized by the mobile electronic device being disconnected from the insurance activation server and any other external communication device;

wherein after said archiving is performed, the method further comprises: while a connection is established between the mobile electronic device and the insurance activation server, said server updating the archive database with each request archived in the non-volatile storage medium;

wherein the method further comprises determining that an insurance claim by the customer relating to an accident is valid by verifying that the insurance coverage was active at a time when the accident occurred based on the most recent requested activation or deactivation, said verifying occurring when the mobile electronic device is connected to the insurance activation server and comprising determining by the server that a request to submit the insurance claim is stored in the mobile electronic device operating in the offline mode.

10. The data processing system of claim 9, wherein the insurance coverage credits are time credits in a bank tracked by the mobile device.

11. The data processing system of claim 10, wherein the method further comprises:

in response to a new request received from the customer for activation of the insurance coverage for a time duration, ascertaining that the remaining amount of time of said time credit exceeds the time duration; and responsive to said ascertaining, granting the new request.

12. The data processing system of claim 9, wherein the requests of the plurality of requests are ordered in a time sequence.

13. The data processing system of claim 9, wherein the mobile electronic device is configured to be used in the offline mode by the customer to activate the insurance coverage from any insurer of a plurality of insurers offering competing insurance products pertaining to the insurance coverage.

14. The data processing system of claim 9, wherein each request requesting activation or deactivation is implemented through use of a single push button in the mobile electronic device to toggle between said activation and said deactivation.

15. The data processing system of claim 9, wherein said verifying further comprises that a date/time stored in the mobile electronic device in response to the mobile electronic device having been turned off and entered into a read-only mode corresponds to the time when the accident occurred.

16. The data processing system of claim 9, wherein the method further comprises: said mobile electronic device tracking insurance coverage credits in a bank while the mobile electronic is operating in the offline mode, said insurance coverage credits being credits for insurance coverage time purchased by the customer.

\* \* \* \* \*